Aug. 15, 1933.  R. WYSS  1,922,409
TORCH HOLDER
Filed Aug. 23, 1932  2 Sheets-Sheet 1
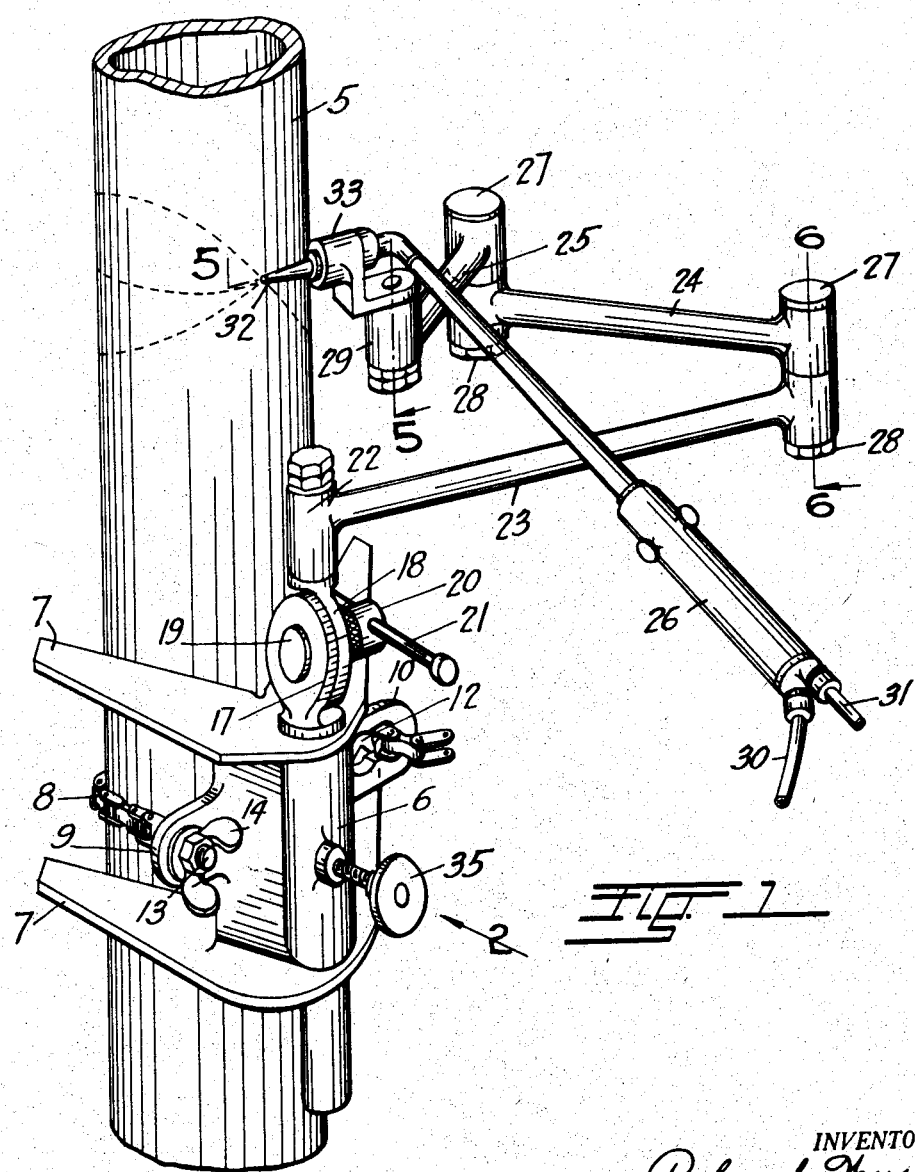
INVENTOR
Roland Wyss
BY
Rollandet & Stratton
ATTORNEYS

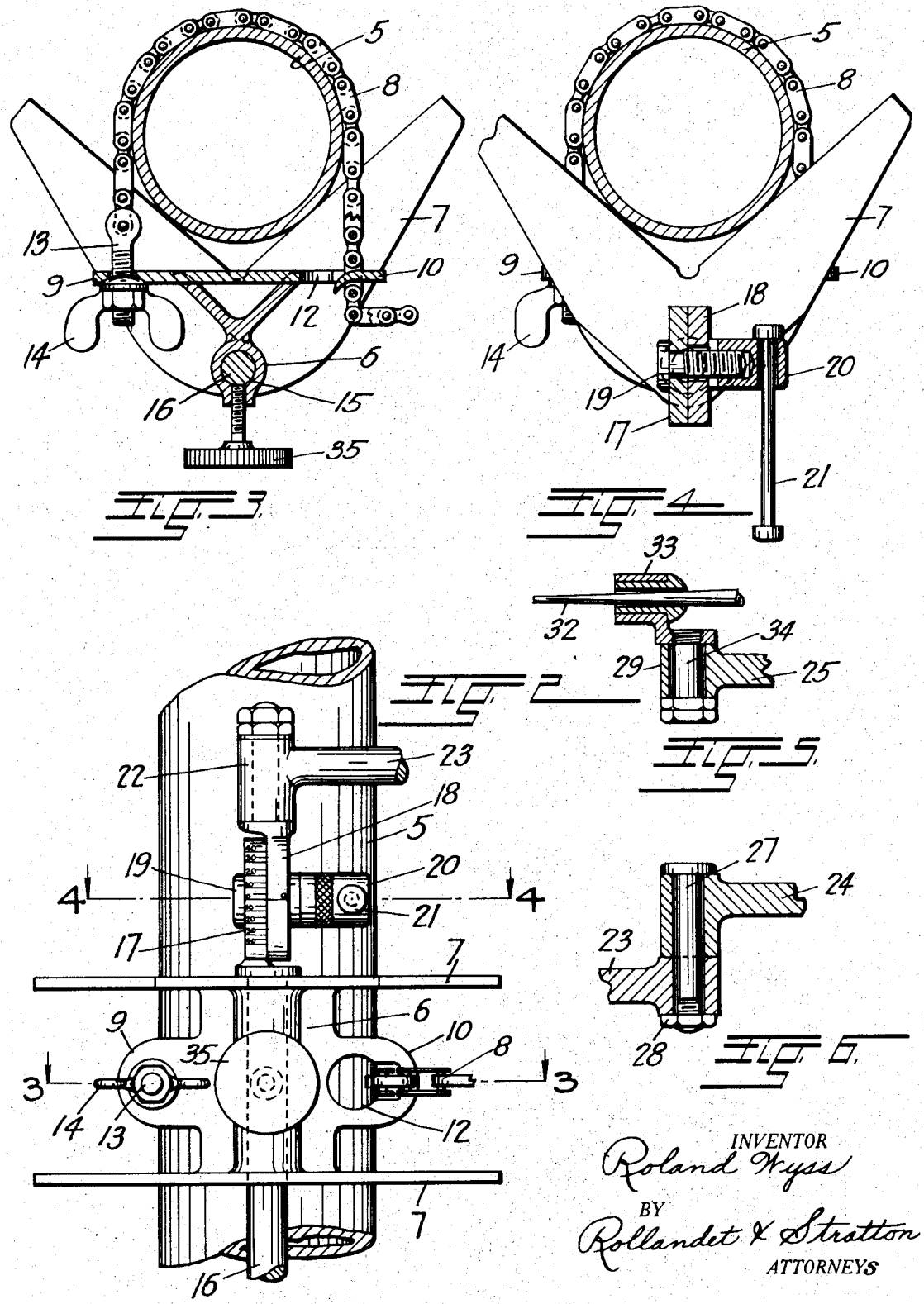

Patented Aug. 15, 1933

1,922,409

UNITED STATES PATENT OFFICE 1,922,409

TORCH HOLDER

Roland Wyss, Brush, Colo.

Application August 23, 1932. Serial No. 630,049

13 Claims. (Cl. 266—23)

This invention relates to cutting tools, and more particularly to apparatus for controlling the movement of a tool to cut the work to which it is applied, at any predetermined angle.

The apparatus is particularly adapted for use in cutting metal pipes and other cylindrical objects, it is preferably used in association with an oxy-acetylene blow-torch, and its principal object resides in the provision of an adjustment whereby the angle of the cutting plane may be variably predetermined to a measurable degree.

The apparatus guides the tool around the pipe or other object in a plane at a predetermined angle to the axis of the pipe, thereby preparing the pipe for joining it to another pipe or object at a desired angle, by welding or other suitable connecting means.

An embodiment of the invention has been shown in the accompanying drawings, in the several views of which corresponding parts are similarly designated, and in which Figure 1 represents a perspective view of the apparatus in its operative relation to a pipe, Figure 2 is an elevation of the clamping and adjusting elements of the apparatus, looking in the direction of the arrow 2 in Figure 1 and drawn to a somewhat larger scale, Figure 3 is a section taken on the line 3—3, Figure 2, Figure 4 is a section along the line 4—4, Figure 2, Figure 5 is a section in the plane indicated by the line 5—5 in Figure 1, and Figure 6, a section on the line 6—6, Figure 1.

Referring further to the drawings, the pipe to be cut is shown at 5. The apparatus is secured upon the pipe by a clamping-element which in its preferred form, consists of a body 6 having two integral forks 7 adapted to embrace the pipe, and a chain 8 which is drawn around the pipe between the forks. The body of the clamping-element has oppositely projecting lugs 9 and 10 to which the chain is fastened, one of the lugs having a keyhole slot 12 to hold a link of the chain and the other lug having an aperture to receive a screw 13 at the opposite end of the chain, adapted to cooperate with a wing-nut 14 for tightening the chain around the pipe.

The body of the clamping-element has furthermore, a vertically bored socket 15 for the rotary support of a pin 16 provided with a flanged head 17 which rests upon the upper fork of the element.

The head 17 which is circular in form and centrally apertured, provides the stationary member of a measuring element of the vernier type, which, in the operation of the apparatus, determines the angle of the plane through which the cutting tool is moved.

The other member of the measuring element consists of a centrally apertured disk 18 rotatable with relation to the head 17, the rotary connection of the two members being established through the medium of a headed bolt 19 and a nut 20 provided with a longitudinally movable turning-bar 21.

The two circular members of the measuring element are graduated at their peripheral edges, to cooperatively measure the angle of the cutting plane relative to the axis of the pipe.

Integrally connected with the rotary disk, is a laterally projecting spindle 22 for the support of an assemblage of jointed arms 23, 24 and 25, the outer one of which supports the cutting-tool 26.

The three arms are connected to move relative to each other and the rotary member of the measuring element about parallel axes and the cutting tool is held on a carrier mounted at the end of the outermost arm to move about an axis parallel to the other axes. The arms are to this end provided with heads which are bored at right angles to the longitudinal extent of the arms for the reception of headed pintles 27 by which they are pivotally connected. Nuts 28 on screw-threaded protruding ends of the pintles, hold the latter against displacement. The outermost arm 25 has at its free extremity a bored head 29 for the pivotal support of the carrier for the cutting tool 26 which, as shown in the drawings, consists of an oxy-acetylene torch. The construction of the torch per se, is not a part of the present invention, the conduits for supplying acetylene and oxygen to the torch having been shown at 30 and 31.

The carrier is preferably composed of a headed pintle 34 rotatable in the head 29 of the arm 25, and an angular nut 33 screwed upon a threaded end of the pintle and apertured for the support of the nozzle 32 of the torch.

In practice, the apparatus is fixedly supported on the work by means of the clamping element, after which the members of the measuring element are adjusted to determine the angle at which it is desired to cut the work by medium of the torch.

The flexible holder composed of the jointed arms permit of moving the torch in the predetermined cutting plane around the work and the position of the axis of rotation of the jointed arms with relation to the axis of the work, i. e., the position of the spindle 22 of the rotary disk 18, determines the plane through which the torch moves; or, in other words, the angle of the cutting plane relative to the axis of the work.

Pivotal adjustment of the pin 16 in the socket 6 of the clamping-element, cooperates with adjustment of the rotary member of the vernier relative to the other member, to determine the angle of the plane described by the torch in its movement around the work, the pin being held in its adjusted positions by a set-screw 35.

The apparatus is thus particularly adapted for mitering pipes, bars and other cylindrical objects at any desired angle within the measuring capacity of the measuring-element, and it completely avoids the necessity of using templets and other similar extraneous devices heretofore employed.

Another advantage of the apparatus is that in the cutting operation the torch is supported by the flexible holder and is not held in the hand of the operator as in the usual methods of cutting heretofore employed. The accuracy of the angle, at which the work is cut, and the smoothness and regularity of the edge of the cut are assured, and labor and time are saved to a considerable extent.

It will be apparent that variations in details of construction and in the arrangement of the cooperating parts of the apparatus as hereinabove described and as shown in the drawings, may be resorted to without departing from the scope and spirit of the invention, as defined in the hereunto appended claims.

What I claim and desire to secure by Letters Patent is:

1. Apparatus of the character described, comprising a measuring-element adapted to predetermine the angle of a cutting-plane relative to a fixed axis of the work, a tool-holder mounted for adjustment by the measuring-element and composed of a plurality of arms joined in end-to-end relation for movement about parallel axes, and a cutting tool pivotally mounted at an end of the holder.

2. Apparatus of the character described, comprising a measuring-element adapted to predetermine the angle of a cutting-plane relative to a fixed axis of the work, composed of two graduated disks, one of which is mounted for rotary adjustment relative to the other, a flexible tool-holder pivotally carried at one end by the adjustable disk, and a cutting-tool at the free end of the holder.

3. Apparatus of the character described, comprising a measuring-element adapted to predetermine the angle of a cutting-plane relative to a fixed axis of the work, composed of a disk rotatable about a fixed axis, a second disk mounted for rotary adjustment relative to the first disk, the disks being graduated to measure the extent of said adjustment, a flexible tool holder pivotally carried at one end by the adjustable disk, and a cutting tool at the free end of the holder.

4. Apparatus of the character described, comprising a support, means to fix the same relative to the work, a measuring-element on the support adapted to predetermine the angle of a cutting plane relative to the axis of the work and composed of a member mounted for rotary adjustment about an axis parallel to that of the work, a member mounted for rotary adjustment relative to the other, a flexible tool-holder pivotally carried at one end on the last-mentioned member, and a tool-carrier pivoted at the free-end of the holder.

5. Apparatus of the character described, comprising a support, means to fix the same relative to the work, a measuring-element on the support adapted to predetermine the angle of a cutting plane relative to the axis of the work and composed of a member mounted for rotary adjustment about an axis parallel to that of the work, a member mounted for rotary adjustment relative to the other, a tool holder composed of a plurality of arms, and a tool-carrier carried on the last-mentioned member, the arms and the tool-carrier being joined together for movement about parallel axes.

6. Apparatus of the character described, comprising a support, means to fix the same relative to the work, a measuring element on the support, composed of graduated members, one of which is rotatably adjustable relative to the other, a flexible tool-holder pivotally mounted at one end on the adjustable member of the measuring-element, and a tool-carrier pivoted at the free end of the holder.

7. Apparatus of the character described, comprising a support, means to fix the same relative to the work, a measuring-element on the support composed of a pin rotatable on the support and having a circular head, means for fixing the pin against rotation, a disk rotatable coaxial relative to the circular head, and carrying a laterally extending spindle, means for fixing the disk in adjusted positions, a flexible holder pivoted at one end on the spindle, and a tool-carrier pivoted at the free end of the holder.

8. Apparatus of the character described, comprising a support, means to fix the same relative to the work, a measuring-element on the support, composed of a pin rotatable on the support and having a circular head, means for fixing the pin against rotation, a disk rotatable coaxial relative to the circular head, and carrying a laterally extending spindle, means for fixing the disk in adjusted positions, a flexible holder composed of a plurality of arms movable conjointly about the spindle and movable relative to each other about axes parallel to that of the spindle, and a tool-carrier on the holder movable about an axis parallel to the others.

9. Apparatus of the character described, comprising a support, means to fix the same relative to the work, a measuring-element on the support, composed of coaxial circular members, one of which is rotatably adjustable relative to the other and carries a radially projecting spindle, means for fixing the adjustable member in adjusted positions, a flexible holder pivoted at one end on the spindle, and a tool-carrier pivoted at the free end of the holder.

10. Apparatus of the character described, comprising a support, means to fix the same relative to the work, a measuring-element on the support, composed of coaxial circular members, one of which is rotatably adjustable relative to the other and carries a radially projecting spindle, means for fixing the adjustable member in adjusted positions, a flexible holder composed of a plurality of arms movable conjointly about the spindle and movable relative to each other about axes parallel to that of the spindle, and a tool-carrier on the holder movable about an axis parallel to the others.

11. Apparatus of the character described, comprising a support, means to fix the same relative to the work, a measuring-element on the support, composed of coaxial circular members, one of which is rotatably adjustable relative to the other and carries a radially projecting spindle, means for fixing the adjustable member in adjusted positions, a flexible holder pivoted at one end on the spindle and composed of pivotally connected arms, and a tool-carrier pivoted at the free end of the holder.

12. Apparatus of the character described comprising a support, means to fix same relative to the work, a tool-holder comprising a plurality of arms pivotally joined in end to end arrangement for movement about parallel axes, a tool-carrier mounted on one of the arms, and a measuring-element on the support carrying the tool-holder and adjustable to predetermine the angle of said parallel axes relative to a fixed axis of the work.

13. Apparatus of the character described comprising a support, means to fix same relative to the work, a measuring element on the support to predetermine the angle of a cutting plane relative to a fixed axis of the work, a tool-holder carried by the measuring-element, comprising a plurality of arms having pivotal connections for their movement about parallel axes, and a tool carrier mounted on one of the arms, the arms cooperating to permit movement of the tool carrier about the fixed axis of the work in the predetermined plane.

ROLAND WYSS.